United States Patent
Bussiere et al.

(10) Patent No.: US 12,297,822 B2
(45) Date of Patent: May 13, 2025

(54) ELECTROCHEMICAL ACTUATORS AND ACTUATOR ARRAYS

(71) Applicant: INSULET CORPORATION, Acton, MA (US)

(72) Inventors: John Richard Bussiere, Littleton, MA (US); Eduardo Luis Latouche, Chelsea, MA (US); Zhifei Ge, Cambridge, MA (US)

(73) Assignee: INSULET CORPORATION, Acton, MA (US)

( * ) Notice: Subject to any disclaimer, the term of this patent is extended or adjusted under 35 U.S.C. 154(b) by 0 days.

(21) Appl. No.: 18/014,859

(22) PCT Filed: Jul. 6, 2021

(86) PCT No.: PCT/US2021/040446
§ 371 (c)(1),
(2) Date: Jan. 6, 2023

(87) PCT Pub. No.: WO2022/010848
PCT Pub. Date: Jan. 13, 2022

(65) Prior Publication Data
US 2023/0287870 A1    Sep. 14, 2023

Related U.S. Application Data (60) Provisional application No. 63/048,955, filed on Jul. 7, 2020.

(51) Int. Cl.
*F04B 43/04* (2006.01)
*F03G 7/00* (2006.01)

(52) U.S. Cl.
CPC ............ *F04B 43/043* (2013.01); *F03G 7/012* (2021.08); *F03G 7/0254* (2021.08)

(58) Field of Classification Search
CPC ...... F04B 43/043; F04B 43/04; F04B 43/046; F04B 43/026; F03G 7/012; F03G 7/0254
See application file for complete search history.

(56) References Cited

U.S. PATENT DOCUMENTS 5,156,591 A * 10/1992 Gross ............... A61M 5/14248
604/20
5,671,905 A    9/1997 Hopkins, Jr.
(Continued)

FOREIGN PATENT DOCUMENTS

WO    WO 93/07920 A1    4/1993
WO    WO 03/018089 A1   3/2003

OTHER PUBLICATIONS

International Search Report and Written Opinion for International Application No. PCT/US2021/040446 dated Oct. 12, 2021.
(Continued)

*Primary Examiner* — Bryan M Lettman
(74) *Attorney, Agent, or Firm* — Goodwin Procter LLP (57) ABSTRACT

In some embodiments, electrochemical actuators include a sealed electrolytic chamber with two or more electrodes disposed therein and associated reservoirs. In some embodiments, the electrochemical actuators include one or more rigid structures that are overmolded onto one or more electrodes to form the electrolytic chambers. In some embodiments, multiple rigid structures that are overmolded onto two separate electrodes may be connected to form one or more electrolytic chambers with a desired configuration of electrodes contained therein. In some embodiments, manufacturing methods and structures relate to the formation of an array of electrochemical actuators.

18 Claims, 9 Drawing Sheets

(56) References Cited

U.S. PATENT DOCUMENTS

| | | | | |
|---|---|---|---|---|
| 5,997,501 | A | * | 12/1999 | Gross ................ A61M 5/14248 |
| | | | | 604/65 |
| 6,699,218 | B2 | | 3/2004 | Flaherty et al. |
| 6,814,852 | B2 | * | 11/2004 | Holstun ................ G01N 27/44 |
| | | | | 204/278 |
| 2004/0113980 | A1 | * | 6/2004 | Lewis ........................ B41J 2/14 |
| | | | | 347/54 |
| 2010/0108534 | A1 | | 5/2010 | Carlstrom, Jr. et al. |
| 2016/0000602 | A1 | * | 1/2016 | Meng .................... A61F 9/0017 |
| | | | | 604/891.1 |
| 2019/0091417 | A1 | | 3/2019 | McCaffrey et al. |
| 2022/0136495 | A1 | * | 5/2022 | Ikedo ................. F04B 43/0736 |
| | | | | 417/395 |

OTHER PUBLICATIONS

International Preliminary Report on Patentability (Chapter 1) for International Application No. PCT/US2021/040446 dated Jan. 19, 2023.

* cited by examiner

ELECTROCHEMICAL ACTUATORS AND ACTUATOR ARRAYS

CROSS REFERENCE TO RELATED APPLICATION

This application is a national stage filing under 35 U.S.C. § 371 of International Patent Application Serial No. PCT/US2021/040446, filed Jul. 6, 2021, which claims priority to U.S. Provisional Application Ser. No. 63/048,955, filed Jul. 7, 2020, the entire contents of each of which are incorporated herein by reference in their entirety.

FIELD

Disclosed embodiments are related to electrochemical actuators and actuator arrays.

BACKGROUND

Ambulatory infusion pumps are oftentimes used for delivering a desired composition, such as a therapeutic compound, to a subject over long-duration periods. Depending on the particular application, ambulatory infusion pumps may either be used to deliver the desired composition subcutaneously, epidurally, and/or intravenously. Ambulatory infusion pumps are typically used for delivering these compositions to subjects where either continuous and/or repeated infusions of the composition are desired for a particular treatment. For example, certain conditions such as diabetes, cancer, chronic pain, infections, gastrointestinal conditions and others may benefit from treatments using ambulatory infusion pumps.

SUMMARY

In one aspect, actuators are provided. In some embodiments, the actuator includes a sealed electrolytic chamber, where the sealed electrolytic chamber includes a first rigid portion and a compliant portion at least partially enclosing an interior of the sealed electrolytic chamber. The actuator also includes a first electrode extending from an exterior of the sealed chamber to an interior of the sealed chamber through the first rigid portion.

In another aspect, methods of making an actuator are provided. In some embodiments, the method of making an actuator includes overmolding a first rigid portion of an electrolytic chamber onto a portion of a first electrode where the first electrode is exposed to an interior of the electrolytic chamber and the first rigid portion of the electrolytic chamber includes an opening, and bonding a first membrane to the first rigid portion around a periphery of the opening to seal the electrolytic chamber.

In yet another aspect, actuator arrays are provided. In some embodiments, the actuator array includes a plurality of sealed electrolytic chambers formed in a rigid structure. Each sealed electrolytic chamber of the plurality of sealed electrolytic chambers includes an opening, and at least two electrodes extending from an exterior of the sealed electrolytic chamber to an interior of the sealed electrolytic chamber. The actuator also includes a first membrane disposed on the plurality of sealed electrolytic chambers, where the first membrane seals the opening of each sealed electrolytic chamber.

In yet another aspect, actuator arrays are provided. In some embodiments, the actuator array includes a first sealed electrolytic chamber including a first compliant portion, a second sealed electrolytic chamber including a second compliant portion, a first electrode extending into an interior of the first sealed electrolytic chamber, a second electrode extending into the interior of the first sealed electrolytic chamber and an interior of the second sealed electrolytic chamber, and a third electrode extending into the interior of the second sealed electrolytic chamber.

In yet another aspect, methods of making actuator arrays are provided. In some embodiments, the method includes disposing a first membrane onto a plurality of electrolytic chambers, where each electrolytic chamber of the plurality of electrolytic chambers includes an opening covered by the first membrane, and each electrolytic chamber of the plurality of chambers includes at least two electrodes that extend from an exterior of the chamber to an interior of the chamber, and bonding the first membrane around a periphery of each opening of the plurality of electrolytic chambers to seal the plurality of electrolytic chambers.

In any of the embodiments above, the actuator includes a second rigid portion of the sealed electrolytic chamber and a second electrode extending from the exterior of the sealed electrolytic chamber to the interior of the sealed electrolytic chamber through the second rigid portion. In some embodiments, the first rigid portion is bonded to the second rigid portion of the sealed electrolytic chamber.

In any of the embodiments above, the actuator includes a second electrode extending from the exterior of the sealed electrolytic chamber to the interior of the sealed electrolytic chamber through the first rigid portion. In some embodiments, the first and second electrodes are interdigitated.

In any of the embodiments above, the actuator includes a reservoir configured to contain a liquid attached to the sealed electrolytic chamber. In some embodiments, the compliant portion of the sealed electrolytic chamber forms at least a portion of the reservoir such that deformation of the compliant portion into an interior of the reservoir displaces the liquid out of the reservoir.

In any of the embodiments above, the compliant portion includes a first membrane. In some embodiments, the actuator includes a second layer attached to the sealed electrolytic chamber such that a volume disposed between the first membrane and the second layer forms a reservoir configured to contain a liquid. In some embodiments, the second layer is a second membrane.

In any of the embodiments above, the actuator includes a fluid tight seal between the first electrode and the first rigid portion of the sealed electrolytic chamber.

In any of the embodiments above, the actuator includes a through hole extending from an exterior surface of the first rigid portion to an interior surface of the first rigid portion. In some embodiments, the actuator includes a seal disposed on, or in, the through hole.

In any of the embodiments above, the actuator includes an electrolyte disposed in the sealed electrolytic chamber that decomposes to generate a gas when exposed to a predetermined voltage potential and/or current.

In any of the embodiments above, the compliant portion is configured to extend at least partially into an interior of the chamber in an initial configuration.

In any of the embodiments above, the sealed electrolytic chamber is overmolded onto at least a portion of the first electrode.

In any of the embodiments above, the method includes overmolding a second rigid portion of the electrolytic chamber onto a portion of a second electrode, the second electrode being exposed to the interior of the electrolytic chamber. In some embodiments, the method includes bonding the first rigid portion of the electrolytic chamber to the second rigid portion of the electrolytic chamber to form the electrolytic chamber.

In any of the embodiments above, the method includes overmolding the first rigid portion of the electrolytic chamber onto a portion of a second electrode. In some embodiments, the second electrode is exposed to the interior of the electrolytic chamber.

In any of the embodiments above, the first electrode extends from an exterior of the sealed electrolytic chamber to the interior of the sealed electrolytic chamber through the first rigid portion of the sealed electrolytic chamber.

In any of the embodiments above, the first electrode forms at least a portion of an interior surface of the sealed electrolytic chamber.

In any of the embodiments above, an elastomeric material is disposed between the first electrode and the first rigid portion.

In any of the embodiments above, the first membrane is configured to extend at least partially into an interior of each sealed electrolytic chamber in an initial configuration.

In any of the embodiments above, the actuator array includes a second layer disposed on the first membrane. In some embodiments, the second layer is bonded to the first membrane and/or the plurality of sealed electrolytic chambers around a periphery of each opening of the plurality of sealed electrolytic chambers to form a plurality of reservoirs disposed between the first membrane and the second layer. In some embodiments, the actuator array includes a third layer disposed on and bonded to the second layer to form a plurality of reservoirs between the second and third layers associated with the plurality of sealed electrolytic chambers such that actuation of the sealed electrolytic chambers deforms the first membrane against the second layer to displace fluid from within the associated reservoirs. In some embodiments, the actuator array includes a plurality of channels formed between the first membrane and the second layer fluidly connected to the plurality of sealed electrolytic chambers.

In any of the embodiments above, the first electrode and the second electrode are configured to have opposite electrical polarities, and the first electrode and the third electrode are configured to have the same electrical polarities.

In any of the embodiments above, the second electrode includes a first portion extending into the interior of the first sealed electrolytic chamber, a second portion extending into the second sealed electrolytic chamber, and a connecting portion disposed between and connecting the first and second portions on an exterior of the first and second sealed electrolytic chambers In any of the embodiments above, the actuator array includes at least one power source operatively coupled to the first electrode, the second electrode, and the third electrode. In some embodiments, the at least one power source is configured to independently vary a voltage potential applied between the first and second electrodes and a voltage potential applied between the second and third electrodes.

In any of the embodiments above, the actuator array includes a third sealed electrolytic chamber including a third compliant portion, and a fourth electrode extending into an interior of the third sealed electrolytic chamber. In some embodiments, the third electrode extends into the interior of the third sealed electrolytic chamber.

In any of the embodiments above, the actuator array includes a membrane disposed over openings formed in the first and second electrolytic chambers to form the first and second compliant portions.

In any of the embodiments above, the plurality of sealed electrolytic chambers are at least partially formed in a first rigid portion of a substrate. In some embodiments, at least one selected from the group of the first, second, and third electrodes are overmolded into and extend through the first rigid portion.

In any of the embodiments above, the actuator array includes an electrolyte disposed in each sealed electrolytic chamber that decomposes to generate a gas when exposed to a predetermined voltage potential and/or current.

In any of the embodiments above, each sealed electrolytic chamber includes a through hole. In some embodiments, the actuator array includes one or more seals disposed on or in the through hole of each sealed electrolytic chamber.

In any of the embodiments above, the method includes disposing a second layer on the first membrane and bonding the second layer to the first membrane and/or the plurality of chambers around a periphery of each opening to form a plurality of reservoirs disposed between the first membrane and the second layer.

In any of the embodiments above, the second layer is a second membrane.

In any of the embodiments above, the method includes overmolding the plurality of electrolytic chambers onto the at least two electrodes of each electrolytic chamber.

In any of the embodiments above, at least one of the at least two electrodes of each chamber extend through a first rigid portion of a substrate the plurality of electrolytic chambers are formed in.

In any of the embodiments above, the method includes performing a first cutting process on a metal strip to partially form the at least two electrodes of each electrolytic chamber. In some embodiments, the method includes performing a second cutting process on the metal strip to fully form the at least two electrodes of each electrolytic chamber. In some embodiments, overmolding of the electrolytic chambers onto the at least two electrodes of each electrolytic chamber is performed prior to the second cutting process.

In any of the embodiments above, the method includes filling each chamber with an electrolyte through a through hole extending from an exterior surface to an interior surface of the chamber. In some embodiments, the electrolyte decomposes to generate a gas when exposed to a predetermined voltage potential and/or current. In some embodiments, the method includes sealing each through hole of the plurality of chambers after filling with the electrolyte.

In any of the embodiments above, the actuator array is manufactured using a reel to reel manufacturing process or a continuous manufacturing process.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

To provide a desired delivery rate of a substance by an infusion pump, infusion pumps oftentimes include expensive and/or bulky pumps. These pumps may both increase the size and/or limit the amount of a therapeutic compound that may be provided to a subject within a desired form factor. Accordingly, the Inventors have recognized a need for pumps that are smaller in form factor, easier to manufacture, offer modular volume capabilities, and/or that provide improved accuracy relative to current infusion pumps.

In view of the above, the Inventors have recognized the benefits associated with electrochemical actuators including a sealed chamber, such as a sealed electrolytic chamber, that is formed in one or more rigid structures. A compliant portion of the sealed chamber may correspond to a flexible membrane sealed around a periphery of an opening of the chamber formed in the one or more rigid structures. For example, the chamber, or multiple chambers, may be formed in a single unitary rigid structure or multiple rigid portions are connected to one another to form a rigid combined structure that the one or more chambers are formed in. In either case, the electrochemical actuator may also include at least two electrodes that extend from an exterior of the rigid structure to an interior of the sealed chamber through the rigid structure for each sealed chamber. At least a portion of each electrode may be exposed to the interior of the sealed chamber to permit electrolysis of an electrolyte contained within the sealed chamber. In some embodiments, the rigid structure may be formed by overmolding one or more rigid structures onto the electrodes. In some embodiments, a reservoir is placed into contact with a compliant portion of an electrolytic chamber to form the overall electrochemical actuator. In some instances, the reservoir may correspond to a rigid layer, such as a rigid membrane, bonded to a second flexible membrane to form the reservoir there between. The second flexible membrane, or other appropriate compliant portion of the reservoir may be disposed on the first flexible membrane, or other compliant portion, of the sealed electrolytic chamber such that gas evolved in the sealed electrolytic chamber may apply a pressure to the reservoir to deform the flexible membrane of the reservoir to dispense a material contained within the reservoir out of an outlet of the reservoir.

In some embodiments, it may be desirable to modify an interface between an electrode and a structure overmolded onto the electrode for various reasons. For example, different configurations and/or types of materials may be used to supplement the bonding of the inherently different materials of the electrodes and overmolded structure. In one such embodiment, an elastomeric material may be overmolded onto, or otherwise applied to, a portion of an electrode prior to an overmolding process. Accordingly, the elastomeric material may be disposed between the electrode and the final rigid overmolded structure such that the overmolded structure applies a compressive force to the elastomeric material which may improve a seal between the overmolded structure and the electrode. In other embodiments, an overmolded structure may be formed using multiple polymers where at least one of the polymers included in the structure exhibits better adhesion to a metal of the electrodes while the other polymers may provide other desired functionalities. In some instances, a surface of an electrode may be modified prior to overmolding to improve the resulting adhesion. For instance, a surface roughness of the one or more overmolded electrodes may be modified prior to overmolding to improve the final bond and interface between the structures. A portion of an electrode to be overmolded may also be coated with an adhesion assisting material and/or a tie layer. In still other embodiments, mechanical features such as mechanical protuberances and/or other features may be formed into a portion of the one or more electrodes to be overmolded. This may create a mechanical interference between the electrodes and overmolded structure that improves the retention of the one or more electrodes in the final overmolded structure. It should be understood that the various modifications to an overmolded structure noted above may either be used individually and/or in combination with each other. Additionally, other modifications to an overmolded interface between an electrode and a structure are also contemplated as the disclosure is not limited to any particular overmolding process.

In some embodiments, it may be desirable to form an array of electrochemical actuators. In such an embodiment, a first compliant membrane may be disposed on a rigid structure including a plurality of chambers, such as a plurality of electrolytic chambers, formed in the rigid structure. Thus, the first complaint membrane may cover a plurality of openings formed in the structure to seal the plurality of chambers. For instance, the first compliant membrane may be bonded around a periphery of an opening of each separate chamber to form a plurality of sealed chambers. Depending on the particular embodiment, electrolyte may either be present in the chambers prior to sealing the first complaint membrane to the structure, or the sealed chambers may be filled after bonding the first complaint membrane to the structure as the disclosure is not so limited. After forming the sealed chambers, in some embodiments, a corresponding plurality of reservoirs may be formed and placed in contact with the flexible portion of the first complaint membrane covering the openings of the separate sealed chambers. For example, a second complaint membrane may be bonded to a rigid membrane to form a plurality of reservoirs there between. The plurality of reservoirs may then be placed into the openings of the separate chambers with the second flexible membrane of the reservoir disposed on the first compliant membrane to form an array of electrochemical actuators.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

Figure 1:
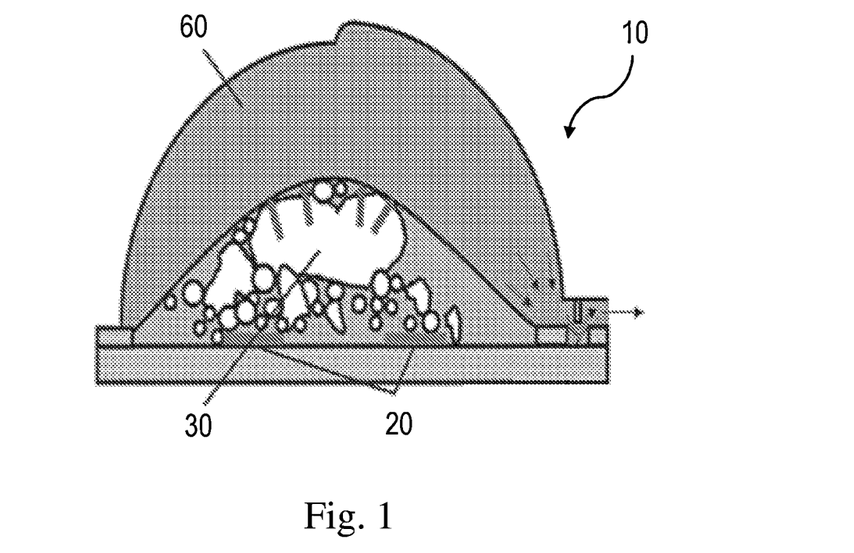
FIG. 1 is a schematic cross-sectional view of one embodiment of an electrochemical actuator during operation.

FIG. 1 presents a schematic of one embodiment of how gas electrolysis may be used to operate an electrochemical actuator 10 as described herein. Specifically, electrodes 20 disposed within an electrolytic chamber apply a voltage differential and/or current to an electrolyte disposed within the electrolytic chamber 30 to disassociate the electrolyte into a gas. The evolved gas produces a pressure for driving the flow of therapeutic compound, or other appropriate composition, from the actuator 10. The reservoir containing the therapeutic compounds, or other composition, and the electrolytic chamber are separated by a flexible membrane 60, so that the electrolyte is not mixed with the medication. The flexible membrane 60 may exhibit the desired mechanical flexibility and barrier properties for the particular application for which it is used. The amount of the therapeutic compound displaced out of the reservoir may be determined by the amount of gas generated within the actuator 10. The amount of generated gas is determined by the total charge passed through the two electrodes which can be measured using an appropriate current sensor, Coulomb counting sensor, or other appropriate type of sensor.

Figure 2:
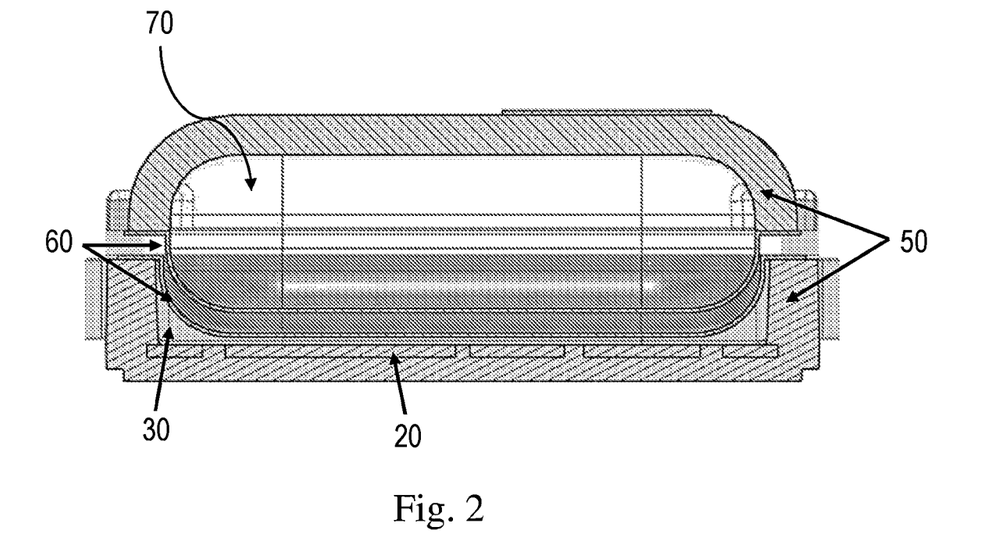
FIG. 2 is a schematic cross-sectional view of one embodiment of an electrochemical actuator.

FIG. 2 depicts another embodiment of an electrochemical actuator. In the depicted embodiment, the electrochemical actuator includes a sealed chamber formed in a rigid structure 50 in the form of an electrolytic chamber 30 including a bottom portion and one or more side portions extending from the bottom portion. In some embodiments, the rigid structure 50 is a unitary structure that is formed as a single integral component, though embodiments in which multiple rigid portions of a structure are separately formed and connected to one another to form one or more chambers are also contemplated. In either case, a compliant membrane 60 is sealed around an opening formed by the one or more side portions to form the sealed electrolytic chamber 30 containing an electrolyte. Two or more electrodes 20 may extend into the interior of the sealed chamber 30 through either a side, top, and/or bottom portion of the rigid structure forming the chamber. The electrodes 20 may be sealed to the rigid structure in any appropriate fashion to ensure that the chamber 30 is sealed. A second compliant membrane is sealed to a separate rigid structure such as a rigid membrane or other structure to form a reservoir 70 containing a desired therapeutic compound or other substance there between. The resulting reservoir 70 is then placed into the opening of the rigid structure with the second compliant membrane of the reservoir disposed on the first compliant membrane of the electrolytic chamber 30. The reservoir may be held against the electrolytic chamber in any appropriate fashion including, for example, bonding, welding, and/or clamping the reservoir within the opening against the first flexible membrane of the electrolytic chamber. Thus, the first membrane of the electrolytic chamber 30 may be deformed against the second membrane of the reservoir by gas generated within the electrolytic chamber 30 to displace a liquid from within the reservoir 70 through an outlet of the reservoir.

In the above embodiment, the first compliant membrane is used to contain an electrolyte to be used to electrolysis within the electrolytic chamber 30 and the second compliant membrane is in contact with a liquid therapeutic compound, or other substance, contained within the reservoir 70 after filling. Advantageously, the reservoir 70 may go through an independent fabrication process to that of the electrolytic chamber 30. This approach may offer several advantages in isolating the therapeutic compounds, or other substance, from potential interaction with the electrolyte used for electrolysis. It may also facilitate quality control steps of the two items. Considering the technical requirements for therapeutic compounds packaging and electrolyte containment, this manufacturing approach may also increase the number of options available for materials to be used in the construction of these components.

Figure 3:
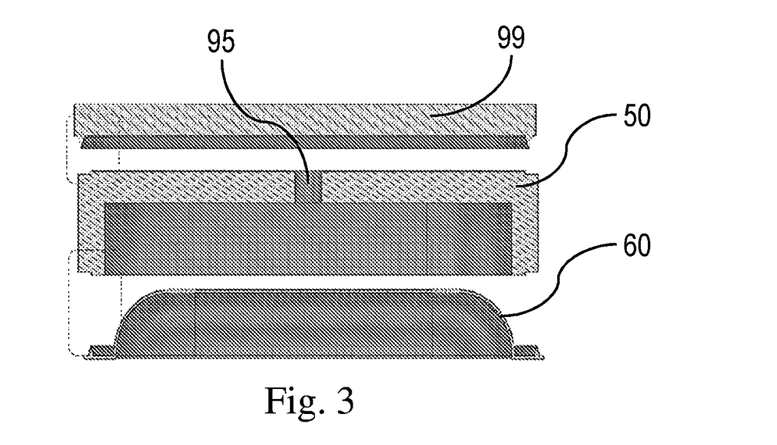
FIG. 3 is a schematic exploded cross-sectional view of one embodiment of an electrolytic chamber.

FIG. 3 presents one embodiment of a rigid structure 50 with an electrolytic chamber formed in the structure. In the depicted embodiment, the rigid structure is bonded to a corresponding flexible membrane to seal the electrolytic chamber. For example, as shown in the figure, the rigid structure 50 including the chamber may be bonded to the flexible membrane using an ultrasonic welding process with appropriate energy directors formed between the portions of the unitary structure in the membrane to be bonded. Additionally, in some embodiments, a sealing cap 99, or other appropriate seal, may be bonded to a side of the rigid unitary structure opposite the flexible membrane, or on another appropriate portion of the rigid structure forming the electrolytic chamber, to seal a filling hole 95 for placing electrolyte into the resulting electrolytic chamber.

In some embodiments, an electrochemical actuator is produced using an over-molding process to form one or more rigid structures directly on the electrodes. Depending on the embodiment, the overmolding process may be done where multiple separate rigid portions of a structure in which the chambers are formed are overmolded onto separate electrodes and/or a single unitary rigid structure may be overmolded onto the electrodes. For example, a molded rigid structure may include a cavity with a size and shape of the desired electrolytic chamber formed therein. This structure may be overmolded onto the electrodes such that at least a portion of each electrode passes through a portion of the rigid structure such that each electrode is exposed to an interior of the resulting electrolytic chamber to permit the desired voltage differentials and/or current to be applied to the electrolyte contained therein during operation. The alternative or more common method of making an electrochemical actuator is to use photochemical etching. Compared with photochemical etching, there are two benefits of using an over-molding process to produce an electrochemical actuator. Specifically, overmolding of a structure onto the electrodes allows for integration of different metals into the process because the overmolding process is not limited to particular chemistries since it is a mechanical process.

Figure 4:
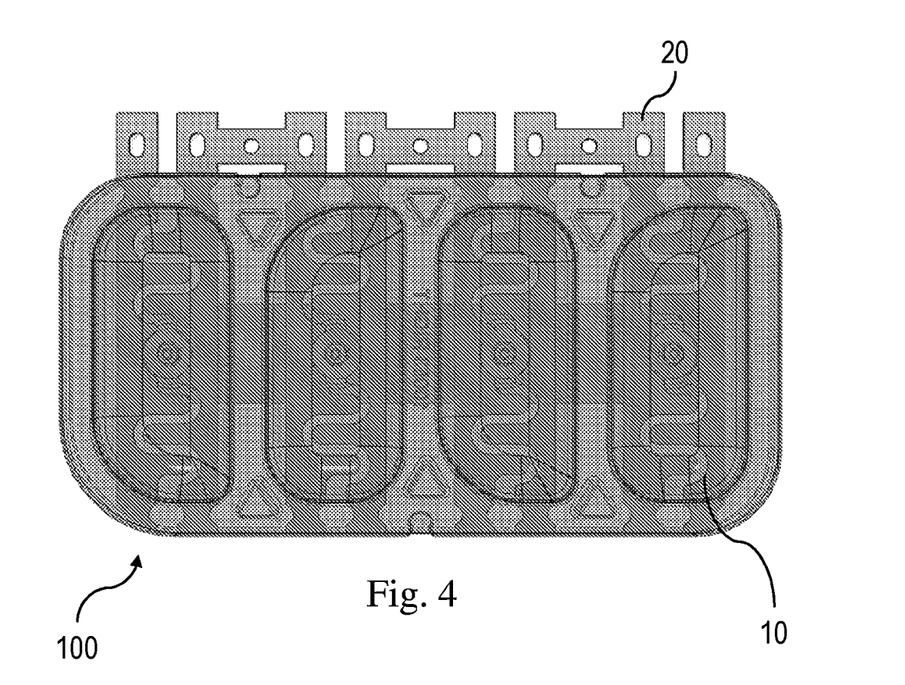
FIG. 4 is a top view of one embodiment of an array of sealed electrolytic chambers.

Additionally, the interfaces between the electrodes and the portion of the overmolded structure that the electrodes extend through into the resulting electrolytic chamber may be automatically sealed during the molding process. In contrast, when using a photochemical process, these interfaces need to be sealed after formation which may increase the risk of leaking electrolyte through the interfaces. That said, embodiments in which a photochemical process, or other formation process, is used to form the described electrochemical actuators are also contemplated. While an individual actuator has been described in the above embodiments, it should be understood that the described electrochemical actuators may be incorporated into an array. For example, as shown in FIG. 4 in some embodiments, a plurality of electrochemical actuators 10 may be incorporated into an array 100 of electrochemical actuators.

Figure 5:
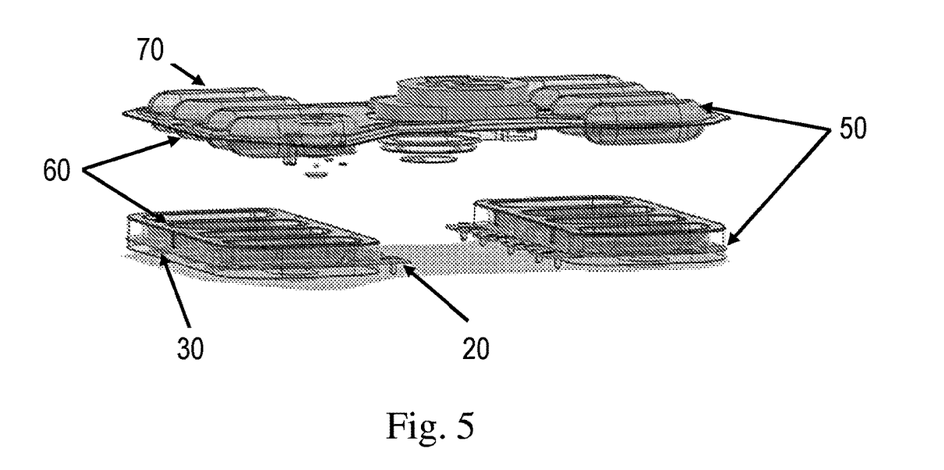
FIG. 5 is an exploded perspective view of one embodiment of an array of electrochemical actuators.
Figure 6:
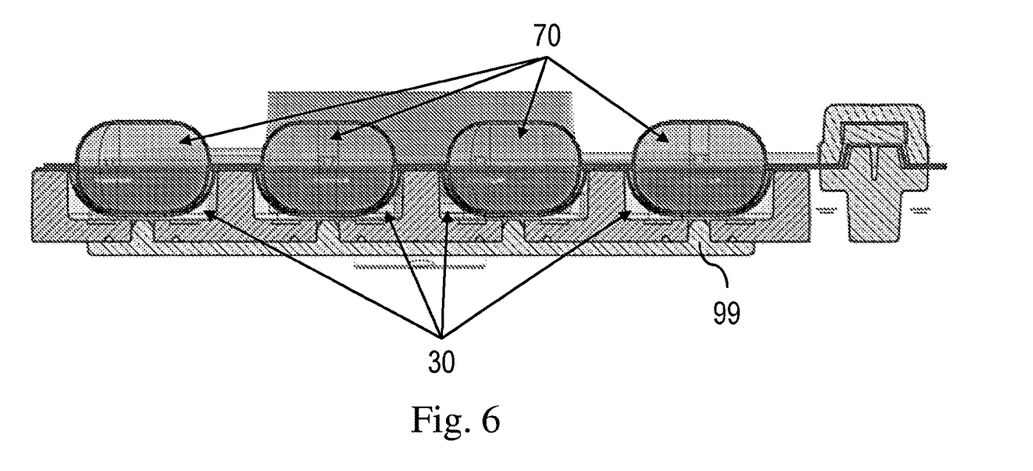
FIG. 6 is a cross-sectional view of one embodiment of an array of electrochemical actuators.
Figure 7:
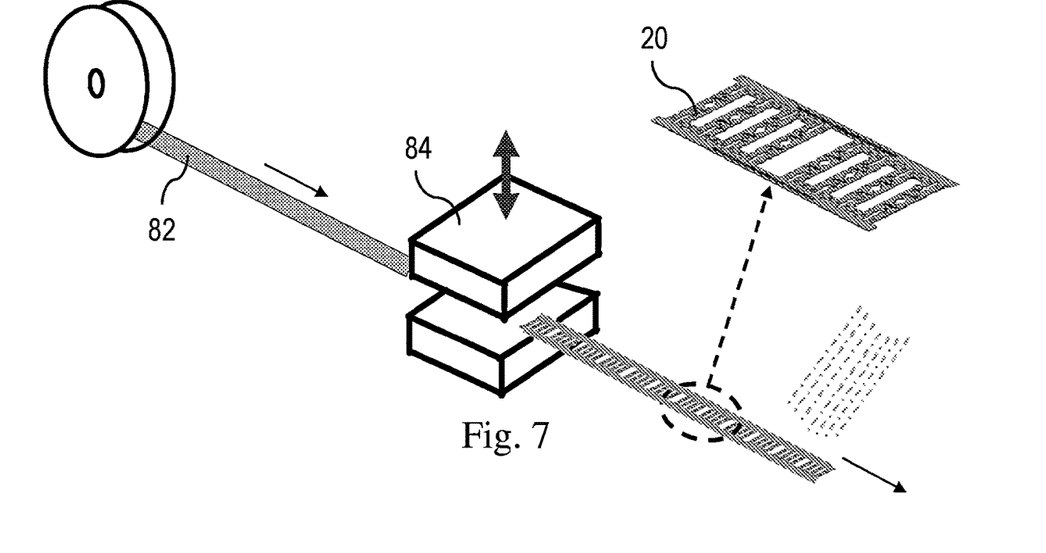
FIG. 7 is a perspective view of one embodiment of an electrode formation process.

FIGS. 5 and 6 show one embodiment of a system including one or more arrays including multiple reservoirs 70 and corresponding electrolytic chambers 30 to form an array of electrochemical actuators. In the depicted arrays, the overall approach is the same: a set of reservoirs and a corresponding set of electrolytic chambers 30 may include corresponding rigid 50 and compliant 60 structures similar to the embodiments described above. However, in some embodiments, it may be advantageous to form multiple reservoirs between a single rigid structure, such as a rigid membrane and a corresponding compliant membrane bonded to the rigid membrane. Additionally, multiple electrolytic chambers 30 may be formed in a rigid structure, which may include one unitary structure or multiple connected rigid portions, with a single flexible membrane bonded around the openings of the multiple electrolytic chambers to form the desired sealed electrolytic chambers. These structures may be assembled and held proximate to one another to form the overall electrochemical actuators for pumping a substance out of the reservoirs.

In the depicted embodiment, the overall device may include eight separate reservoirs, or any other appropriate number of separate reservoirs, which may either be fluidly connected to a common outlet from the device and/or separate outlets as the disclosure is not so limited. In either case, the depicted construction may simplify the manufacturing of multiple electrochemical actuators using multiple structures formed in the various described rigid and compliant components.

FIGS. 7-14 depict one possible manufacturing method for forming an array of electrochemical actuators. As shown in the figures, a metal strip 82 may be fed into a stamping 84, or other formation process, to form a desired pattern of a plurality of electrodes along a length of the metal strip 82. In the depicted embodiment, the electrodes 20 extend across a width of the metal strip 82 in a direction that is angled, and in some instances perpendicular, to a length of the strip extending in the machine direction of the process. After forming the desired pattern of electrodes on the metal strip, the metal strip may be deburred as well as subjected to cleaning, rinsing, and/or drying depending on the condition of the electrodes after the formation process.

Figure 8:
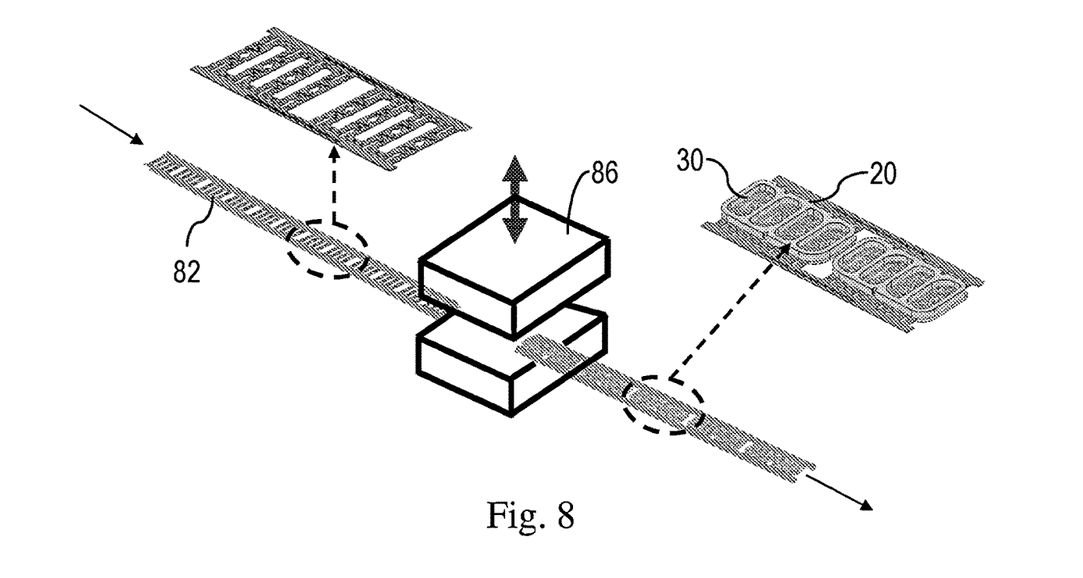
FIG. 8 is a perspective view of one embodiment of an overmolding process.
Figure 9:
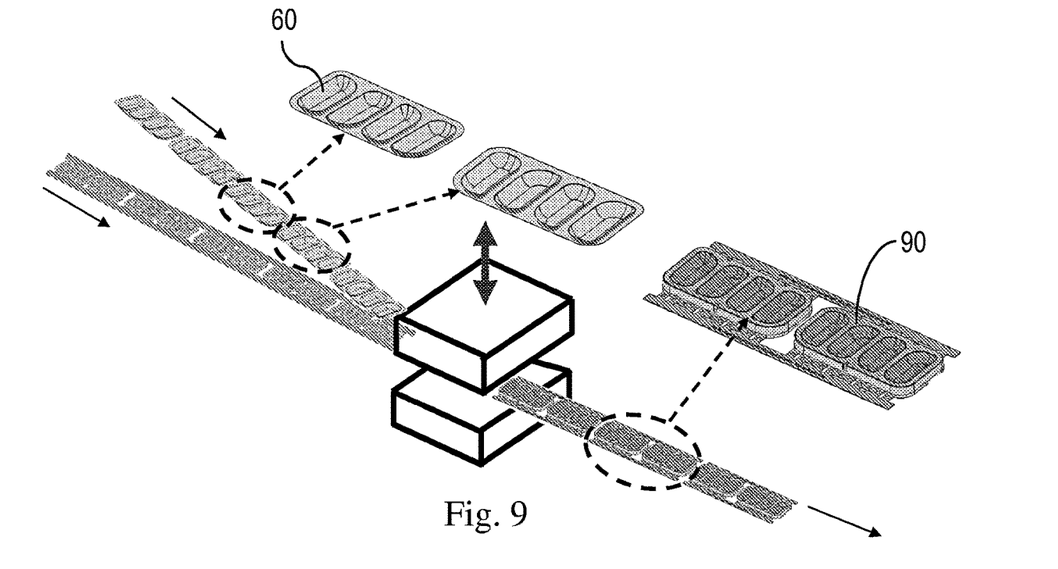
FIG. 9 is a perspective view of one embodiment of applying a flexible membrane to an array of electrolytic chambers.

After forming the electrodes, the metal strip 82 may be fed into a mold 86 where one or more rigid unitary structures may be overmolded onto the as formed electrodes. For example, as shown in the figures, sets of electrodes 20 may have multiple electrolytic chambers 30 overmolded onto the electrodes 20 such that at least two electrodes extend into and are exposed to an interior of each electrolytic chamber 30. After overmolding of the rigid structures onto the sets of electrodes 20, a compliant membrane 60 may be bonded to each electrolytic chamber 30 to form a sealed electrolytic chamber. In some embodiments, a separate compliant membrane may be bonded to each structure with the electrolytic chambers 30 formed therein. Alternatively, a continuous membrane may be applied to the various structures as the disclosure is not limited in this fashion. As also shown in the figures, the membranes 60 may be formed such that a portion of the membrane may extend into each electrolytic chamber. In either case, after the depicted bonding and sealing process, the combined structure of the sealed electrolytic chamber may then be subjected to an electrolyte filling process.

Figure 10:
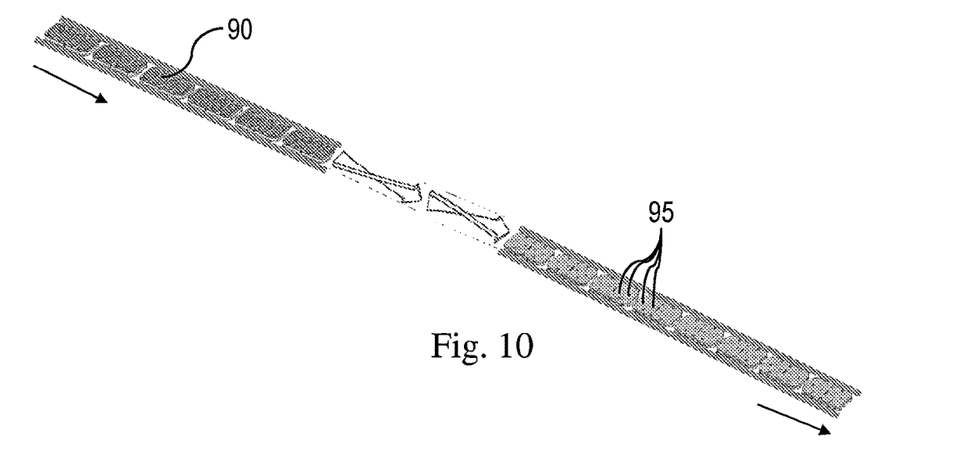
FIG. 10 is a perspective view of one embodiment of inverting a strip including multiple arrays of electrolytic chambers for a filling process.
Figure 11:
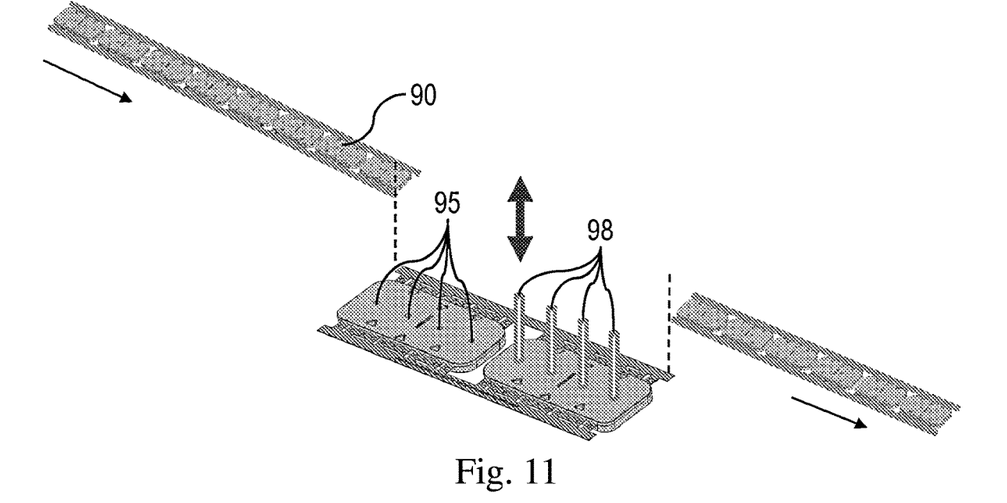
FIG. 11 is a perspective view of one embodiment of an electrolyte filling process.
Figure 12:
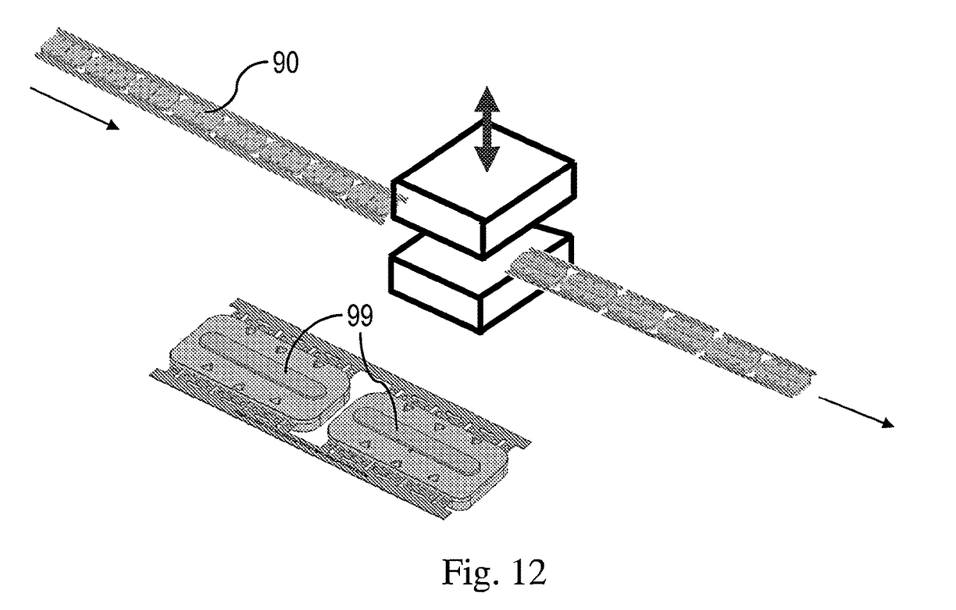
FIG. 12 is a perspective view of one embodiment of a sealing process for through holes formed in the arrays of electrolytic chambers.

In some embodiments, the overmolded structures 90, as shown in FIGS. 9 and 10, may include a plurality of through holes 95 that extend from an exterior surface of the overmolded structure to an interior surface of each corresponding electrolytic chamber. In the depicted embodiment, the through holes 95 are formed on a bottom surface of the overmolded structure 90. Accordingly, the strip including the sealed electrolytic chambers may be inverted, as shown in FIG. 10, such that the through holes 95 are oriented vertically upwards relative to a local direction of gravity. One or more filling nozzles 98 may then be placed in fluid communication with the through holes 95 to fill the sealed electrolytic chambers with a desired electrolyte, as shown in FIG. 11. After the electrolyte filling process, one or more sealing structures, such as the sealing strip 99, may be applied to the through holes to seal the through holes with the electrolyte contained within the electrolytic chambers, as shown in FIG. 12.

Figure 13:
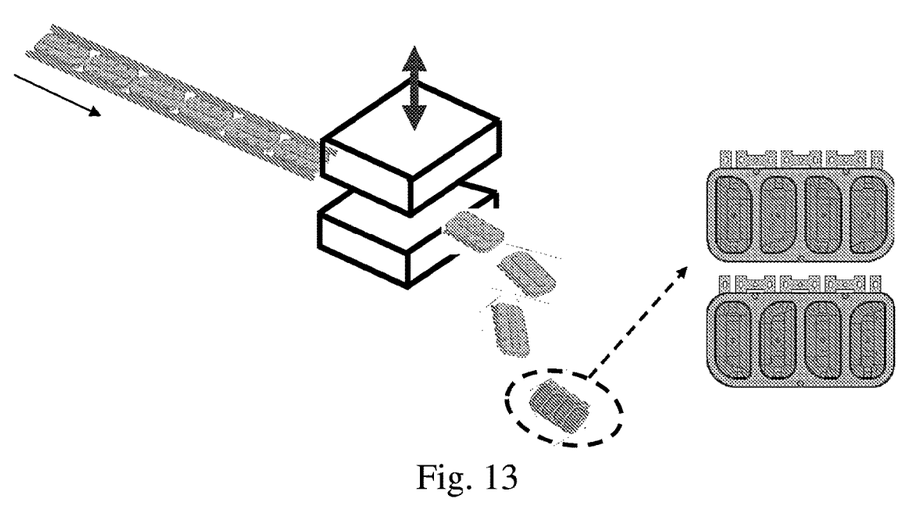
FIG. 13 is a perspective view of one embodiment of a process for separating the individual arrays of sealed electrolytic chambers.
Figure 14:
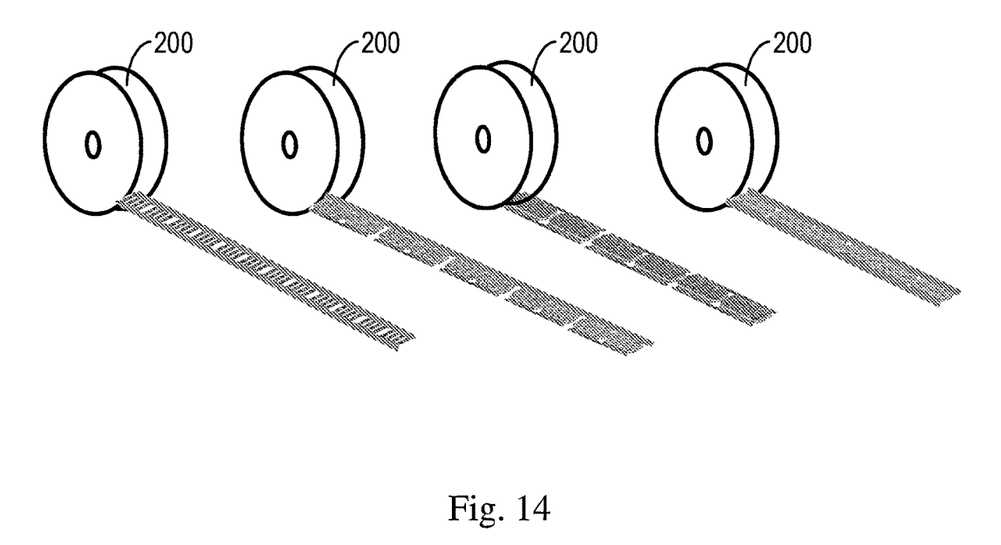
FIG. 14 is a perspective view of reels including the various intermediate components of arrays of electrolytic chambers disposed along the length of strips wound onto the individual reels.

After filling, the strips including the individual arrays of sealed electrolytic chambers may be separated using any appropriate cutting and/or machining process. Additionally, in some instances, one or more sides of the electrodes may be trimmed such that the electrode connections are present on either one or both sides of the chambers depending on the desired electrical layout. In either case, individual arrays of sealed electrolytic chambers 100 may be provided, as shown in FIG. 13. Depending on the particular embodiment, either individually formed reservoirs, and/or a corresponding array of reservoirs, may be placed into the openings of the sealed electrolytic chambers against the flexible membrane to form an array of electrochemical actuators.

It should be understood that the above-described manufacturing processes may either be done on an individual set of electrodes and/or using continuous strips of material. Accordingly, the disclosed arrays of electrochemical actuators may either be manufactured using a continuous manufacturing process using reel to reel processing techniques, see reels 200 including strips of components in various states of manufacture in FIG. 14, and/or individual batch manufacturing may be used as the disclosure is not limited in this fashion.

Figure 15:
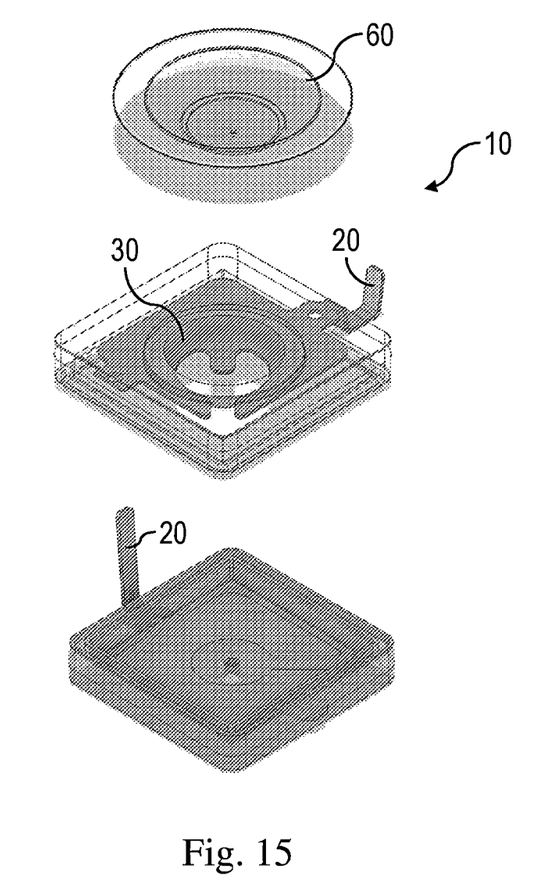
FIG. 15 is an exploded perspective view of one embodiment of a sealed electrolytic chamber.
Figure 16:
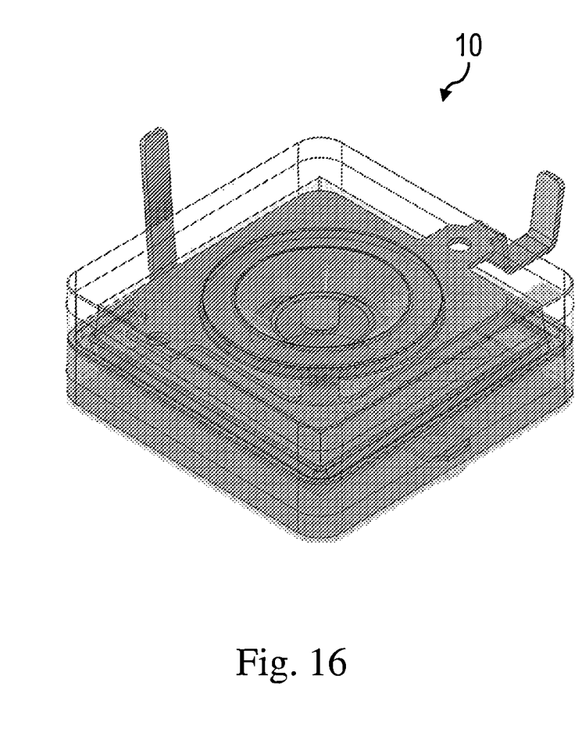
FIG. 16 is a perspective view of the embodiment of a sealed electrolytic chamber of FIG. 15.

The above embodiments have been directed to electrolytic chambers that are formed in a single unitary rigid structure. However, as previously noted, embodiments in which one or more electrolytic chambers are formed in multiple connected rigid portions of an overall rigid structure are also contemplated. One such embodiment is depicted in FIGS. 15 and 16 which depict an electrochemical actuator 10 that may be manufactured using two or more electrodes 20 overmolded into two separate portions of an electrolytic chamber 30 that are subsequently bonded to each other to form the overall electrolytic chamber with an opening sealed by a flexible membrane 60 disposed on and bonded around a periphery of the opening. Depending on the particular materials used, the rigid portions of the overall rigid structure forming the one or more chambers may be bonded to one another using thermal welding, ultrasonic welding, adhesives, brazing, and/or any other appropriate method capable of providing a combined structure with a desired number of sealed chambers formed therein. In either case, the electrodes overmolded into the two or more rigid portions of the structure may have portions that extend through the associated rigid portion of the structure such that the electrodes are exposed to an interior of the resulting one or more chambers once the rigid portions are connected to one another as previously discussed. In embodiments in which the rigid portions of the combined structure are made from one or more polymers, the resulting polymer-to-polymer interface may provide increased bonding strength and increased sealing of the resulting electrolytic chamber. However, embodiments in which different materials are used for the rigid portions of the structure are also contemplated.

Figure 17:
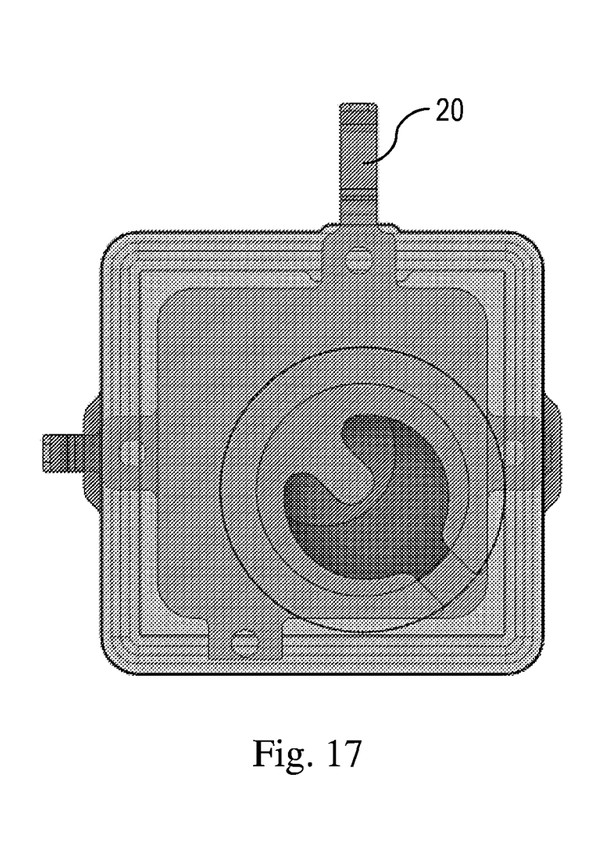
FIG. 17 is a top cross-sectional view of one embodiment of a sealed electrolytic chamber.
Figure 18:
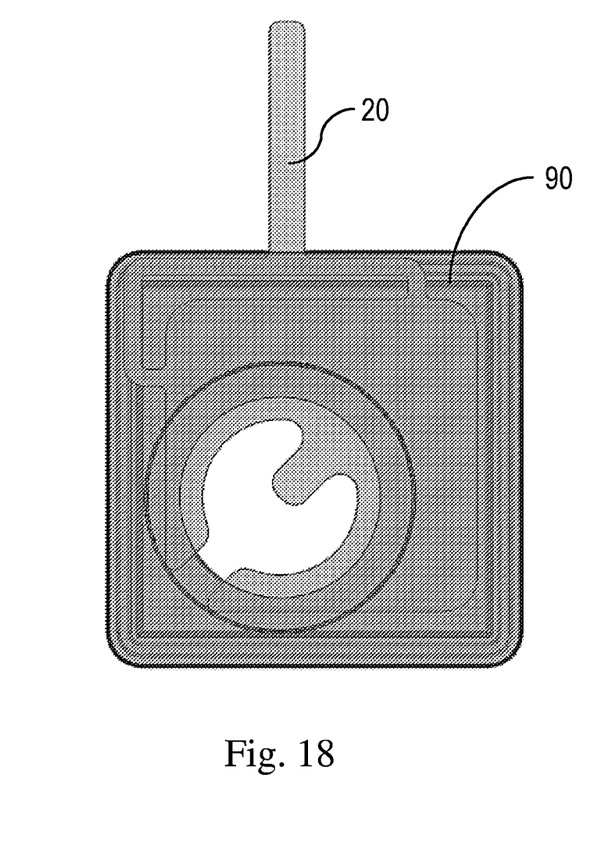
FIG. 18 is a top cross-sectional view of one embodiment of a sealed electrolytic chamber.

FIGS. 17 and 18 depict different embodiments of how an electrode 20 may extend from an exterior of a rigid structure to an interior of an electrolytic chamber 30 formed in the structure. In some instances, it may be desirable to increase a length of the electrode extending through a wall of the electrolytic chamber without increasing a thickness of the electrolytic chamber. For example, as shown in FIG. 17, the electrode 20 extends directly through a wall of the electrolytic chamber in a relatively straight linear arrangement such that a relatively smaller length of the electrode is embedded in the rigid structure. In contrast, FIG. 18 depicts an embodiment in which a length of the electrode 20 embedded in the overmolded structure 90 is greater than a thickness of the wall of the electrolytic chamber the electrode extends through. Such a configuration may be provided using a number of different electrode configurations. For example, the electrode may include one or more electrode leads that follow one or more non-linear paths from an exterior surface of a rigid structure to an interior surface of a corresponding electrolytic chamber formed in the rigid structure. Of course, it should be understood that embodiments in which a thickness of a wall of the chamber is simply increased to provide a desired length of an electrode overmolded within a rigid structure are also contemplated.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. An actuator array comprising:
a first sealed electrolytic chamber including a first compliant portion;
a second sealed electrolytic chamber including a second compliant portion;
a first electrode extending into an interior of the first sealed electrolytic chamber;
a second electrode extending into the interior of the first sealed electrolytic chamber and an interior of the second sealed electrolytic chamber; and
a third electrode extending into the interior of the second sealed electrolytic chamber.

2. The actuator array of claim 1, wherein the first electrode and the second electrode are configured to have opposite electrical polarities and the first electrode and the third electrode are configured to have a same electrical polarity.

3. The actuator array of claim 1, wherein the second electrode includes a first portion extending into the interior of the first sealed electrolytic chamber, a second portion extending into the second sealed electrolytic chamber, and a connecting portion disposed between and connecting the first and second portions on an exterior of the first and second sealed electrolytic chambers.

4. The actuator array of claim 1, further comprising at least one power source operatively coupled to the first electrode, the second electrode, and the third electrode, wherein the at least one power source is configured to independently vary a voltage potential applied between the first and second electrodes and a voltage potential applied between the second and third electrodes.

5. The actuator array of claim 1, further comprising a third sealed electrolytic chamber including a third compliant portion, and a fourth electrode extending into an interior of the third sealed electrolytic chamber, wherein the third electrode extends into the interior of the third sealed electrolytic chamber.

6. The actuator array of claim 1, further comprising a membrane disposed over openings formed in the first and second electrolytic chambers to form the first and second compliant portions.

7. The actuator array of claim 1, wherein the first sealed electrolytic chamber and the second sealed electrolytic chamber are at least partially formed in a first rigid portion of a substrate, and wherein at least one selected from the group of the first, second, and third electrodes are overmolded into and extend through the first rigid portion.

8. The actuator array of claim 1, further comprising an electrolyte disposed in each sealed electrolytic chamber, wherein the electrolyte is configured to decompose to generate a gas when exposed to a predetermined voltage potential and/or current.

9. The actuator array of claim 1, wherein each of the first sealed electrolytic chamber and the second sealed electrolytic chamber includes a through hole.

10. The actuator array of claim 9, further comprising one or more seals disposed on or in the through hole of each of the first sealed electrolytic chamber and the second sealed electrolytic chamber.

11. The actuator array of claim 1, wherein the first electrode and the second electrode are interdigitated.

12. The actuator array of claim 1, wherein the second electrode and the third electrode are interdigitated.

13. The actuator array of claim 1, further comprising a first reservoir configured to contain a liquid, wherein the first reservoir is attached to the first sealed electrolytic chamber, wherein the first compliant portion of the first sealed electrolytic chamber forms at least a portion of the first reservoir such that deformation of the first compliant portion into an interior of the first reservoir displaces the liquid out of the first reservoir.

14. The actuator array of claim 13, further comprising a second reservoir configured to contain a liquid, wherein the second reservoir is attached to the second sealed electrolytic chamber, wherein the second compliant portion of the second sealed electrolytic chamber forms at least a portion of the second reservoir such that deformation of the second compliant portion into an interior of the second reservoir displaces the liquid out of the second reservoir.

15. The actuator array of claim 1, further comprising a rigid structure, wherein the first sealed electrolytic chamber and the second sealed electrolytic chamber are formed in the rigid structure.

16. The actuator array of claim 15, further comprising a first fluid tight seal between the first electrode and the rigid structure and a second fluid tight seal between the second electrode and the rigid structure.

17. The actuator array of claim 16, wherein an elastomeric material is disposed between the first electrode and the rigid structure.

18. The actuator array of claim 17, wherein an elastomeric material is disposed between the second electrode and the rigid structure.

* * * * *